United States Patent Office 3,008,952
Patented Nov. 14, 1961

3,008,952
CELLULOSE ESTERS CONTAINING THE SULFONATE GROUP
George P. Touey and John E. Kiefer, Kingsport, Tenn., assignors to Eastman Kodak Company, Rochester, N.Y., a corporation of New Jersey
No Drawing. Filed Feb. 1, 1960, Ser. No. 5,629
6 Claims. (Cl. 260—215)

This invention relates to a new class of cellulose esters. In particular, it relates to new esters of cellulose containing both aliphatic acyl and α-sulfoaliphatic acyl groups.

It is well known that α-sulfoaliphatic acyl acids, such as sulfoacetic acid, are esterification catalysts for cellulose. For example, cellulose can be acetylated with acetic anhydride using sulfoacetic acid catalyst. The resulting esters contain only trace quantities of sulfur.

It has now been found that α-sulfoaliphatic acids react with cellulose or cellulose compounds having free and esterifiable hydroxyl groups in the presence of an alkaline catalyst and an aliphatic anhydride impeller. The products obtained are esters of cellulose containing both acyl and α-sulfoaliphatic acyl groups. Those containing more than about 0.2 sulfo groups per glucose unit are water soluble and therefore have utility as thickening agents, emulsifying stabilizing agents, film formers, detergent additives, and the like.

One object of this invention is to disclose a new class of cellulose esters containing α-sulfoaliphatic acyl groups. Another object is to disclose new water-soluble cellulose derivatives. A third object is to disclose a method for preparing these esters.

The class of cellulose esters described in this invention can be represented as:

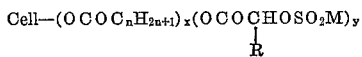

where "Cell" represents an anhydroglucose unit of the cellulose chain, $x+y=3$ or less, $n=1$ to 3, R can be hydrogen or an alkyl group with 1 to 2 carbon atoms, and M can be H, $NH_4$, a metal ion, or an amine.

These products can be prepared by reacting an α-sulfoaliphatic acid containing 2 to 4 carbon atoms with cellulose using a fatty acid anhydride as an impeller and a basic catalyst.

For example, 0.25–2.0 moles of sulfoacetic acid are dissolved in an amine such as pyridine. One mole of cellulose or esterifiable cellulose compound and four moles of acetic anhydride are added and the mass is refluxed until the desired degree of esterification is attained. If the reaction is continued to approximately the triester stage, the product dissolves in the pyridine. The ester is then precipitated and washed with a solution consisting of 80% MeOH, 17% water, and 3% sodium acetate. The cellulose acetate sodium sulfoacetate prepared in this manner contains 3 to 12% sulfur.

Any convenient source of cellulose can be used to prepare the esters described in this invention. For example wood pulp, cotton linters or ground cellulose can be used. Instead a cellulose ester or cellulose ether having free and esterifiable hydroxyl groups can be used. The cellulose can be activated by soaking in water, by mercerization or any other means known to the art. However, when the reaction is carried out in a swelling agent for the cellulose, such as pyridine, no activation step is necessary.

The α-sulfoaliphatic acids employed in this invention are α-sulfoacetic acid, α-sulfopropionic acid, and α-sulfobutyric acid. They can be prepared by heating sulfuric acid with the corresponding anhydride, or by heating sulfur trioxide with the corresponding aliphatic acid.

Acetic anhydride, propionic anhydride or butyric anhydride can be used as the impeller in the preparation of the new cellulose esters described in this invention. However, acetic anhydride is preferred because of its lower cost.

The esterifications described in this invention are catalyzed by basic materials such as pyridine, sodium acetate, or potassium acetate.

These new water-soluble cellulose derivatives have many uses already established for some of the commercial grades of water-soluble cellulose derivatives such as sodium carboxymethyl cellulose, hydroxyethyl cellulose, and methyl cellulose. Thus, they can be used as thickeners for water based paints and latex paints, as stabilizing agents for oil in water emulsions, as drilling mud additives to prevent water-loss and as detergent additives to prevent redeposition of soil particles on a fabric during laundering.

Example 1

One hundred sixty-two parts of wood pulp were slurried in 1000 parts of pyridine. One hundred forty parts of α-sulfoacetic acid and 400 parts of acetic anhydride were added. The mixture was refluxed until the wood pulp dissolved (3 hr.). The product was precipitated and washed in a solution consisting of 80% methanol, 17% water, and 3% sodium acetate. It was finally dried at 100° C.

The cellulose acetate sodium sulfoacetate contained 4.3% (D.S.=0.45 sulfoacetate groups per glucose unit) and 32.1% acetyl (D.S.=2.45 acetyl groups per glucose unit). A 1% water solution of the product had a viscosity of 500 cps. at 25° C.

Example 2

One hundred sixty-two parts of cotton linters were slurried in 1000 cc. dimethylformamide. Two hundred eighty parts of α-sulfoacetic acid, 400 parts of acetic anhydride and 98 g. of potassium acetate were added. The mass was heated at 100° C. until the cotton linter dissolved (4 hr.). The product was precipitated and washed with 80% aqueous methanol containing 2% potassium acetate.

The cellulose acetate potassium sulfoacetate contained 7.5% sulfur (D.S.=0.9 sulfoacetate groups per glucose unit and 22% acetyl (D.S.=2.0 acetyl groups per glucose unit). A 1% water solution had a viscosity of 200 cps. at 25° C.

Example 3

Two hundred and forty-six parts of cellulose diacetate was dissolved in 1000 parts of pyridine. One hundred and forty parts of α-sulfoacetic acid and 204 parts of acetic anhydride were added. The solution was heated to 80° C. for 2 hr. The product was precipitated and washed in a solution consisting of 80% methanol, 17% water, and 3% sodium acetate. It was then dried at 100° C.

The cellulose acetate sodium sulfoacetate was water soluble and contained 4.1% sulfur (D.S. 0.43 sulfoacetate groups per glucose unit) and 32.7% acetyl (D.S. 2.5 acetyl groups per glucose unit). The product was stable to heat. After 4 hours at 190° C. the color of the ester changed from white to a very light tan.

In preparing cellulose esters in accordance with our invention the reaction temperature is within the range of 70 to 150° C., preferably 80–120° C. The minimum amount of anhydride is that needed to react with the water formed during the esterification. For example, to prepare an ester from cellulose with a degree of substitution of 2.5 (acyl and sulfoacyl) would require 2.5 moles of anhydride per $C_6$ unit of cellulose.

To obtain water-soluble products it is desirable that the degree of substitution with respect to the sulfoacetate group be between 0.25 and 2.00, preferably 0.3–1.0 per $C_6$ unit of cellulose.

We claim:
1. Cellulose esters having the following formula:

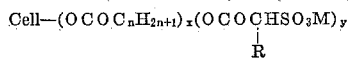

wherein "Cell" represents a substituted or unsubstituted anhydroglucose unit of the cellulose chain, $n=1$ to 3, the sum of $x$ and $y$ is no more than 3, R is a substituent selected from the group consisting of hydrogen and the alkyl groups of 1–2 carbon atoms and M is a substituent selected from the group consisting of hydrogen, sodium and potassium.

2. Cellulose acetate α-sulfoacetate.
3. Cellulose acetate sodium α-sulfoacetate.
4. A method of preparing a soulfoacetic acid ester of cellulose which comprises esterifying a cellulose compound containing free and esterifiable hydroxyl groups in an esterification bath essentially consisting of an α-sulfoaliphatic acid, an alkaline catalyst and an aliphatic acid anhydride impeller at a temperature within the range of 70–150° C., until a substantial content of sulfoaliphatic acid radicals is imparted to the cellulose.

5. A method of preparing a cellulose ester containing α-sulfoaliphatic acid groups which comprises reacting upon cellulose with an esterification bath essentially consisting of α-sulfoacetic acid, acetic anhydride as the impeller and pyridine at a temperature within the range of 70–150° C., until a substantial content of sulfoacetyl groups has been imparted to the cellulose.

6. A method of preparing sulfoacetic acid esters of cellulose which comprises esterifying cellulose diacetate with an esterification bath essentially consising of α-sulfoacetic acid, acetic anhydride and pyridine at a temperature within the range of 70–150° C., for a time sufficient to impart a substantial sulfoacetyl content to the cellulose diacetate.

References Cited in the file of this patent
UNITED STATES PATENTS

| | | |
|---|---|---|
| 2,036,423 | Malm et al. | Apr. 7, 1936 |
| 2,241,235 | Bachman | May 6, 1941 |